United States Patent [19]
Kaneko

[11] Patent Number: 5,653,180
[45] Date of Patent: Aug. 5, 1997

[54] APPARATUS FOR INCINERATING WASTE MATERIAL BY DRY DISTILLATION & GASIFICATION

[75] Inventor: Masamoto Kaneko, Takasaki, Japan

[73] Assignee: Kinsei Sangyo Co., Ltd., Takasaki, Japan

[21] Appl. No.: 506,569

[22] Filed: Jul. 25, 1995

[30] Foreign Application Priority Data

Jul. 25, 1994 [JP] Japan ................... 6-172455

[51] Int. Cl.$^6$ .......................................... F23N 5/02
[52] U.S. Cl. ..................... 110/190; 110/185; 110/229
[58] Field of Search .................. 110/185, 187, 110/190, 229, 101 C, 101 CF

[56] References Cited

U.S. PATENT DOCUMENTS

| | | | |
|---|---|---|---|
| 4,517,906 | 5/1985 | Lewis et al. | 110/190 X |
| 4,951,583 | 8/1990 | McGill et al. | 110/190 X |
| 5,213,051 | 5/1993 | Kaneko | 110/190 X |
| 5,445,087 | 8/1995 | Kaneko | 110/190 X |
| 5,477,790 | 12/1995 | Foldyna et al. | 110/229 X |

FOREIGN PATENT DOCUMENTS 02-135280  5/1990  Japan.

*Primary Examiner*—Henry A. Bennett
*Assistant Examiner*—Susanne C. Tinker
*Attorney, Agent, or Firm*—Paul A. Guss

[57] ABSTRACT

A waste material such as waste tires is incinerated by dry distillation and gasification in gasification and combustion furnaces. The waste material in the gasification furnace is determined as having been ignited when the temperature of a combustible gas in the combustion furnace is detected by a temperature sensor as having reached a temperature at which the combustible gas is capable of spontaneous combustion within a predetermined time period after an igniting nozzle stops supplying combustion flames to the waste material in the gasification furnace. If the waste material is not determined as having been ignited, then the igniting nozzle is controlled to supply combustion flames again to the waste material in the gasification furnace.

8 Claims, 3 Drawing Sheets

APPARATUS FOR INCINERATING WASTE MATERIAL BY DRY DISTILLATION & GASIFICATION

BACKGROUND OF THE INVENTION

1. Field of the Invention

The present invention relates to an apparatus for incinerating waste materials such as waste tires, for example.

2. Description of the Prior Art

One known apparatus for incinerating waste materials such as waste tires is disclosed in Japanese Laid-Open Patent Publication No. 2-135280. Specifically, the disclosed incinerating apparatus comprises an apparatus for incinerating a waste material by processing the waste material through dry distillation and gasification.

The disclosed incinerating apparatus has a gasification furnace in which a waste material is placed. In the gasification furnace, a portion of the waste material is burned while the remainder of the waste material is subjected to a dry distillation (i.e., thermally decomposed) with the heat of combustion, until finally the waste material is completely combusted and ashed. A combustible gas produced when the waste material is thermally decomposed is introduced from a gasification furnace through a gas passage into a combustion furnace. In the combustion furnace, the supplied combustible gas is mixed with oxygen (air) and burned at such a temperature as to sufficiently reduce nitrogen oxides. In this manner, the waste material is combusted without causing environmental pollutions which would otherwise result from excessive nitrogen oxides.

More specifically, combustion of a portion of the waste material and dry distillation of the remainder of the waste material in the gasification furnace, and combustion of the combustible gas in the combustion furnace are carried out as follows:

The combustion of a portion of the waste material and dry distillation of the remainder of the waste material are started by placing the waste material in the gasification furnace and thereafter supplying combustion flames from an ignition nozzle of an igniter mounted in a lower side wall of the gasification furnace to the waste material for a predetermined period of time. When the combustion flames are supplied, a portion of the waste material near the ignition nozzle is ignited and the fire is transferred between pieces of the waste material. The combustion spreads to surrounding pieces of the waste material and becomes stable. When the stable combustion of the portion of the waste material is started, dry distillation of the waste material is started by the heat of combustion, generating a combustible gas. The amount of the generated combustible gas increases as the dry distillation of the waste material progresses.

The combustible gas generated by the dry distillation in the gasification furnace is introduced through the gas passage into the combustion furnace. In the combustion furnace, the combustible gas is mixed with oxygen and ignited by an igniter mounted in the combustion furnace. At this time, the temperature of the combustible gas as it is burned in the combustion furnace is detected by a temperature sensor mounted in the combustion furnace. After the waste material has been ignited, the detected temperature increases as the amount of the combustible gas generated in the gasification furnace increases and hence the combustible gas introduced into the combustion furnace increases.

When the detected temperature of the combustible gas as it is burned increases until it reaches a temperature at which the combustible gas starts spontaneous combustion, the igniter in the combustion furnace is inactivated, and an oxygen supply connected to the gasification furnace regulates the amount of oxygen supplied to the gasification furnace such that the detected temperature will be kept at a predetermined substantially constant level at which the amount of nitrogen oxides generated by the combustion of the combustible gas is sufficiently small, and supplies the gasification furnace with an amount of oxygen necessary to effect combustion of the portion of the waste material and dry distillation of the remainder of the waste material.

The temperature at which the combustible gas is burned in the combustion furnace is therefore maintained at a substantially constant level at which the amount of nitrogen oxides is sufficiently small. The combustible gas is therefore completely combusted without the danger of environmental pollutions.

To ignite a portion of the waste material placed in the gasification furnace, combustion flames are supplied from the ignition nozzle to the waste material for a predetermined period of time, as described above. When the combustion of the portion of the waste material is stabilized, stable dry distillation progresses with the heat of combustion until the waste material is ashed. It is preferable that the overall process from the ignition of the portion of the waste material to the ashing of the waste material be effected automatically for increased incinerating efficiency and reduced labor cost.

If a different type of waste material is placed in a different manner in the gasification furnace, then when combustion flames are supplied from the ignition nozzle to the waste material, the fire may not be well transferred between pieces of the waste material, and the combustion may not spread. In this case, the combustion of the waste material becomes unstable and suffers a flame failure, and the dry distillation is stopped. It has heretofore been customary for the operator to confirm whether the waste material is ignited in a manner to keep dry distillation of the waste material in progress, and in the event of an ignition failure, to manually operate the igniter again to re-ignite the waste material. Consequently, the overall process from the ignition of the portion of the waste material to the ashing of the waste material has not been automatized.

It has also been the practice to confirm an ignition of the waste material by detecting a preset temperature as an ignited temperature with a temperature sensor mounted in the gasification furnace. However, since the temperature sensor only confirms an ignition of the waste material automatically, the operator is still required to manually actuate the igniter again in the event of an ignition failure. Depending on the type of the waste material placed in the gasification furnace and the manner in which the waste material is placed in the gasification furnace, the temperature in the gasification furnace may sometimes sharply increase temporarily regardless of the fact that the waste material has not been ignited in a manner to keep dry distillation of the waste material in progress. When the sharply increased temperature is detected by the temperature sensor, an ignition cannot be confirmed reliably.

SUMMARY OF THE INVENTION

It is therefore an object of the present invention to provide an apparatus for incinerating a waste material in an automatic process ranging from an ignition of the waste material through dry distillation thereof to an ashing of the waste material, by reliably and automatically igniting the waste material.

To achieve the above object, there is provided in accordance with the present invention an apparatus for incinerating a waste material by processing the waste material through dry distillation and gasification, comprising a gasification furnace for storing a waste material therein and burning a portion of the waste material and thermally decomposing the remainder of the waste material by way of dry distillation with the heat of combustion of the portion of the waste material, thereby producing a combustible gas, first igniting means disposed in a lower portion of said gasification furnace and having an igniting nozzle for supplying combustion flames to the waste material for a given time period to ignite and combust the portion of the waste material, a combustion furnace connected to said gasification furnace through a gas introduction passage for combusting the combustible gas introduced therein from said gasification furnace through the gas introduction passage, second igniting means for supplying combustion flames to the combustible gas in said combustion furnace to ignite the combustible gas until the temperature of the combustible gas in said combustion furnace reaches a temperature at which the combustible gas is capable of spontaneous combustion, gas combustion temperature detecting means for detecting the temperature of the combustible gas as it is burned in said combustion furnace, oxygen supply means for supplying said gasification furnace with an amount of oxygen required to combust the portion of the waste material and thermally decompose the remainder of the waste material by way of dry distillation while adjusting the amount of oxygen supplied to said gasification furnace to keep substantially constant the temperature of the combustible gas detected by said gas combustion temperature detecting means after the combustible gas starts spontaneous combustion in said combustion furnace, and ignition control means for determining that the waste material has been ignited when the temperature of the combustible gas detected by said gas combustion temperature detecting means has reached the temperature at which the combustible gas is capable of spontaneous combustion within a predetermined time period after said igniting nozzle stops supplying the combustion flames to the waste material, and controlling said first igniting means to supply combustion flames again from said igniting nozzle to the waste material if the waste material is not determined as having been ignited.

If the waste material is ignited well after the supply of combustion flames from the igniting nozzle to the waste material is stopped, then the dry distillation of the waste material progresses as the combustion of the waste material is spread and stabilized, increasing the amount of the combustible gas generated. Therefore, the temperature of the combustible gas as it is burned in the combustion furnace by the second igniting means is progressively increased up to a temperature at which the combustible gas is capable of spontaneous combustion usually within a certain time period. Therefore, it is determined whether the ignition of the waste material is of such a nature as to keep the dry distillation of the waste material in progress by determining whether the temperature of the combustible gas detected by said gas combustion temperature detecting means has reached the temperature at which the combustible gas is capable of spontaneous combustion within a predetermined time period after said igniting nozzle stops supplying the combustion flames to the waste material. If the temperature of the combustible gas detected by said gas combustion temperature detecting means has not reached the temperature at which the combustible gas is capable of spontaneous combustion within the predetermined time period, then it is determined that after said igniting nozzle stops supplying the combustion flames to the waste material, no fire is transferred well between pieces of the waste material, and the combustion is not spread and stabilized, i.e., the generation of the combustible gas is insufficient due to an ignition failure. The waste material is not determined as being ignited, and the ignition control means controls the first igniting means to ignite the waste material again.

The ignition control means is thus capable of reliably and automatically confirming whether the ignition of the waste material is of such a nature as to keep the dry distillation of the waste material in progress. If the waste material is not determined as being ignited, then the ignition control means controls the first igniting means to automatically supply combustion flames from the igniting nozzle to the waste material. Therefore, a process ranging from igniting to ashing of the waste material can automatically be carried out.

Since the dry distillation of the waste material progresses if the waste material has been ignited well, no problem arises if the ignition of the waste material is determined until after the temperature of the combustible gas has reached the temperature at which the combustible gas is capable of spontaneous combustion. However, it is preferable to re-ignite the waste material as quickly as possible in the event of an ignition failure. According to the present invention, said ignition control means comprises hearth temperature detecting means mounted in a bottom wall of said gasification furnace for detecting a hearth temperature of the waste material, and means for controlling said first igniting means to supply combustion flames again from said igniting nozzle to the waste material when the hearth temperature of the waste material which is detected by said hearth temperature detecting means has not reached a predetermined temperature after said igniting nozzle stops supplying the combustion flames to the waste material until the temperature of the combustible gas detected by said gas combustion temperature detecting means reaches the temperature at which the combustible gas is capable of spontaneous combustion.

The hearth temperature detecting means directly detects the hearth temperature of the waste material. The ignition control means directly confirms whether the waste material has been ignited by determining whether the hearth temperature of the waste material which is detected by said hearth temperature detecting means has reached a predetermined temperature or not. If the hearth temperature of the waste material has not reached a predetermined temperature, the waste material is re-ignited even before the temperature of the combustible gas in the combustion furnace reaches the temperature at which the combustible gas is capable of spontaneous combustion. Therefore, the ignition control means detects an ignition failure of the waste material and re-ignites the waste material prior to the time when the temperature of the combustible gas in the combustion furnace reaches the temperature at which the combustible gas is capable of spontaneous combustion. The time at which the ignition control means re-ignites the waste material can thus be advanced.

The ignition control means comprises means for controlling said first igniting means to supply combustion flames again from said igniting nozzle to the waste material when the hearth temperature of the waste material which is detected by said hearth temperature detecting means has not reached said predetermined temperature a predetermined time period after said hearth temperature of the waste material reached said predetermined temperature, after said igniting nozzle stops supplying the combustion flames to the waste material until the temperature of the combustible gas detected by said gas combustion temperature detecting means reaches the temperature at which the combustible gas is capable of spontaneous combustion.

Depending on the type of the waste material placed in the gasification furnace and the manner in which the waste material is placed in the gasification furnace, the hearth temperature in the gasification furnace may sometimes sharply increase temporarily. In this case, the hearth temperature reaches the predetermined temperature and the waste material is determined as being ignited regardless of the fact that the waste material has not been ignited in a manner to keep dry distillation of the waste material in progress. To avoid such a drawback, the ignition control means detects the hearth temperature of the waste material again after it has reached the predetermined temperature, and re-ignites the waste material if the hearth temperature of the waste material has not reached the predetermined temperature.

Therefore, even when the hearth temperature in the gasification furnace has merely sharply increased temporarily, but the waste material has not actually been ignited in a manner to keep dry distillation of the waste material in progress, an ignition failure can reliably be detected and hence an ignition of the waste material can be confirmed with increased reliability.

Furthermore, said hearth temperature detecting means comprises first hearth temperature detecting means disposed closely to said igniting nozzle for detecting a hearth temperature of the waste material, and second hearth temperature detecting means spaced horizontally a given distance from said first hearth temperature detecting means and disposed remotely from said igniting nozzle for detecting a hearth temperature of the waste material, and said ignition control means comprises means for controlling said first igniting means to supply combustion flames again from said igniting nozzle to the waste material when the hearth temperatures of the waste material which are detected by said first and second hearth temperature detecting means have not reached respective predetermined temperatures after said igniting nozzle stops supplying the combustion flames to the waste material until the temperature of the combustible gas detected by said gas combustion temperature detecting means reaches the temperature at which the combustible gas is capable of spontaneous combustion.

In the gasification furnace, a region of the waste material in the vicinity of the igniting nozzle is ignited and then the fire is transferred to a surrounding region of the waste material, so that the combustion of the waste material is spread and stabilized. The ignition control means determines that the waste material has been ignited well only when both the hearth temperature, detected by the first hearth temperature detecting means, of the waste material in the vicinity of the igniting nozzle and the hearth temperature, detected by the second hearth temperature detecting means, of the waste material remote from the ignition nozzle have reached the respective temperatures. If both the hearth temperatures detected by the respective first and second hearth temperature detecting means have not reached the respective temperatures, then the ignition control means determines that no fire has been transferred well and the combustion of the waste material has not been spread and stabilized, i.e., the generation of the combustible gas is insufficient due to an ignition failure, and re-ignites the waste material with the first igniting means.

Consequently, if no fire has been transferred well within a time period until the temperature of the combustible gas in the combustion furnace reaches the temperature at which the combustible gas is capable of spontaneous combustion, then the ignition control means detects an ignition failure and re-ignites the waste material. Thus, an ignition of the waste material can be confirmed with increased reliability.

The ignition control means comprises means for controlling said first igniting means to supply combustion flames again from said igniting nozzle to the waste material when the hearth temperature of the waste material which is detected by said first hearth temperature detecting means has not reached a predetermined temperature after said igniting nozzle stops supplying the combustion flames to the waste material until the temperature of the combustible gas detected by said gas combustion temperature detecting means reaches the temperature at which the combustible gas is capable of spontaneous combustion, and controlling said first igniting means to supply combustion flames again from said igniting nozzle to the waste material when the hearth temperature of the waste material which is detected by said second hearth temperature detecting means has not reached a predetermined temperature after the hearth temperature of the waste material which is detected by said first hearth temperature detecting means has reached said predetermined temperature.

As described above, the ignition control means first confirms that the waste material in the vicinity of the position where the first hearth temperature detecting means is located has been ignited reliably, and then detects the hearth temperature of the waste material in the vicinity of the position where the second hearth temperature detecting means is located. In this manner, the ignition control means can determine whether the hearth temperatures detected by the respective first and second hearth temperature detecting means have reached the respective predetermined temperatures.

Moreover, the ignition control means comprises means for controlling said first igniting means to supply combustion flames again from said igniting nozzle to the waste material when the hearth temperature of the waste material which is detected by said first hearth temperature detecting means has not reached said predetermined temperature a predetermined time period after said hearth temperature of the waste material detected by said first hearth temperature detecting means reached said predetermined temperature, and controlling said first igniting means to supply combustion flames again from said igniting nozzle to the waste material when the hearth temperature of the waste material which is detected by said second hearth temperature detecting means has not reached said predetermined temperature a predetermined time period after said hearth temperatures of the waste material detected by said first and second hearth temperature detecting means reached said predetermined temperatures, respectively.

Therefore, the ignition control means can reliably detect an ignition failure even in the event that the hearth temperatures of the waste material are only sharply increased temporarily. The reliability with which an ignition of the waste material is confirmed by the first and second hearth temperature detecting means can be increased.

The apparatus further comprises a flame-permeable protector disposed between the waste material stored in said gasification furnace and a tip end of said igniting nozzle for allowing the combustion flames supplied from said igniting nozzle to pass therethrough and preventing the waste material from contacting the tip end of said igniting nozzle.

If the waste material stored in the gasification furnace were pressed against the tip end of the igniting nozzle, combustion flames would not smoothly be supplied from the igniting nozzle to the waste material. The flame-permeable protector positioned as described above creates a space between the waste material and the igniting nozzle for well supplying combustion flames from the igniting nozzle to the waste material through the space. The flame-permeable protector preferably comprises a mesh screen of simple structure.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

An apparatus for incinerating waste materials such as waste tires according to the present invention will be described with reference to FIGS. 1 through 3.

Figure 1:
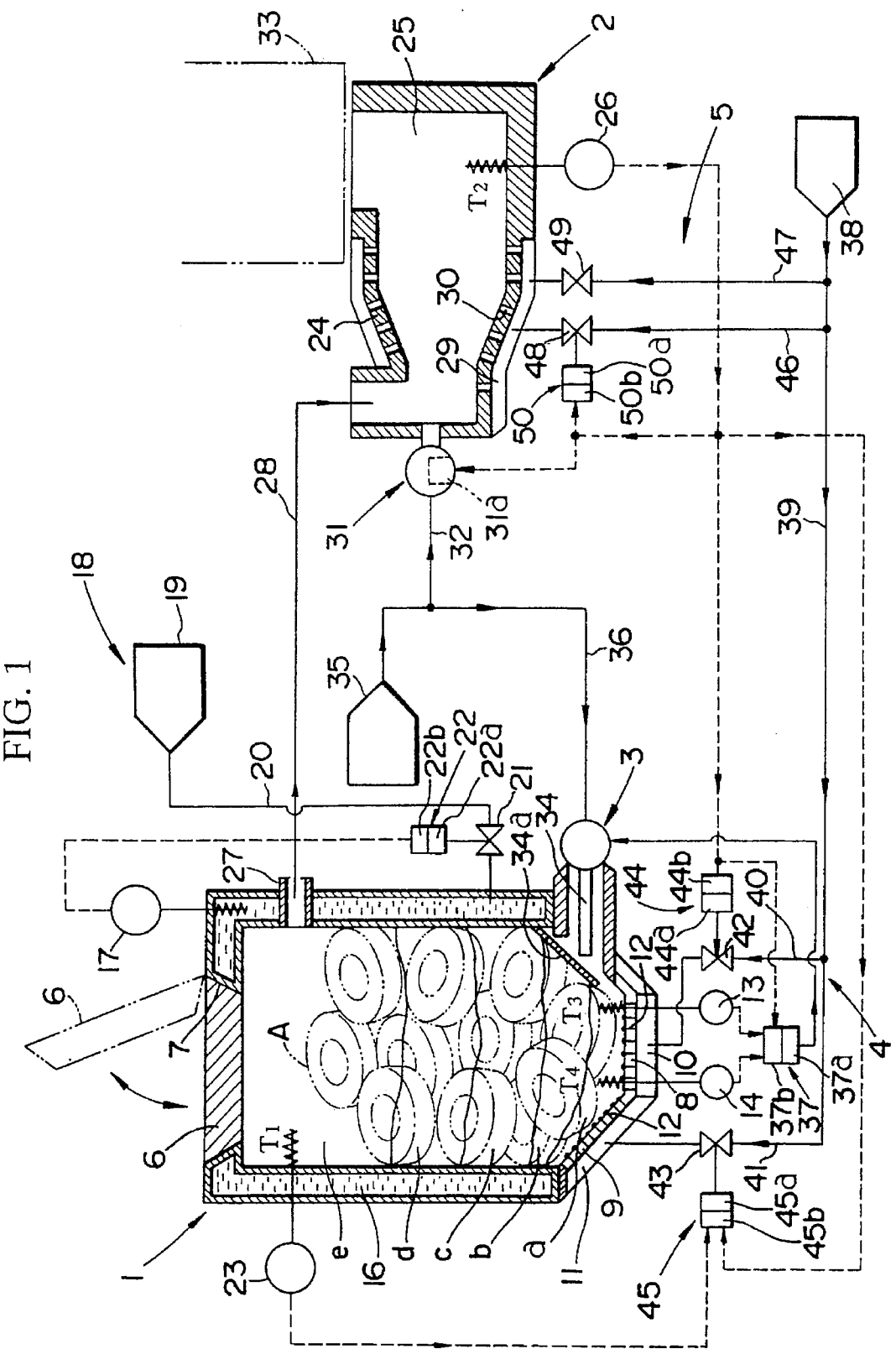
FIG. 1 is a schematic diagram of an apparatus for incinerating a waste material according to the present invention.

As shown in FIG. 1, the apparatus includes a gasification furnace 1 for thermally decomposing by way of dry distillation, gasifying, burning, and ashing a waste material A such as waste tires placed in the gasification furnace 1, a combustion furnace 2 for combusting a combustible gas produced when the waste material A is thermally decomposed by dry distillation in the gasification furnace 1, an igniter (first igniting means) 3 for supplying combustion flames to the waste material A for a predetermined period of time to combust a portion of the waste material A, an oxygen supply device 4 for supplying oxygen (air) to the gasification furnace 1, and an oxygen supply device 5 for supplying oxygen (air) to the combustion furnace 2.

The gasification furnace 1 has a charge inlet 7 defined in an upper wall thereof and openable and closable by a hinged door 6. The waste material A can be charged into the gasification furnace 1 through the charge inlet 7 as it is opened by the door 6. When the charge inlet 7 is closed by the door 6, the interior space of the gasification furnace 1 is virtually isolated from the ambient space.

The gasification furnace 1 has a downwardly projecting frustoconical lower wall composed of a bottom wall section 8 and a slanted side wall section 9. The bottom and side wall sections 8, 9 have respective empty chambers 10, 11 defined in their outer surfaces and isolated from the interior space of the gasification furnace 1. The empty chambers 10, 11 are held in communication with the interior space of the gasification furnace 1 only through air supply ports 12 defined in the bottom and side wall sections 8, 9. A temperature sensor (first hearth temperature detecting means) 13 for detecting the hearth temperature of the waste material A is mounted on an inner surface of the bottom wall section 8 (inside of the gasification furnace 1) near the igniter 3. Another temperature sensor (second hearth temperature detecting means) 14 is mounted on the inner surface of the bottom wall section 8 remotely from the igniter 3, the temperature sensor 14 being horizontally spaced a distance from the temperature sensor 13.

The gasification furnace 1 has a water jacket 16 defined in its surrounding wall for cooling the gasification furnace 1. The water jacket 16 is isolated from the interior space of the gasification furnace 1. A water level sensor 17 for detecting a water level in the water jacket 16 is mounted on the upper wall of the gasification furnace 1.

The water jacket 16 is supplied with cooling water from a water supply device 18. The water supply device 18 comprises a water supply 19 disposed outside of the gasification furnace 1, a water supply pipe 20 interconnecting the water supply 19 and the water jacket 16, a flow control valve 21 disposed in the water supply pipe 20, and a valve controller 22 for opening and closing the flow control valve 21. The valve controller 22 is supplied with a detected water level signal from the water level sensor 17.

The valve controller 22 comprises an actuator 22a such as a motor for selectively opening and closing the flow control valve 21, and a control unit 22b comprising a CPU, etc. for controlling operation of the actuator 22a. The control unit 22b monitors the water level in the water jacket 16 as it is detected by the water level sensor 17, and operates the actuator 22a depending on the detected water level in the water jacket 16.

The flow control valve 21 is opened by the valve controller 22 to supply cooling water from the water supply 19 through the water supply pipe 20 to the water jacket 16. The valve controller 22 opens and closes the flow control valve 21 so that the water level detected by the water level sensor 17 reaches a predetermined level.

A temperature sensor 23 for detecting a temperature $T_1$ in the gasification furnace 1 is mounted on an upper portion of the surrounding wall of the gasification furnace 1.

The combustion furnace 2 comprises a burner section 24 for mixing a combustible gas produced upon dry distillation of the waste material A and oxygen (air) needed for complete combustion of the combustible gas, and a combusting section 25 for combusting the combustible gas which is mixed with oxygen. The combusting section 25 is held in communication with the burner section 24 at its distal end. A temperature sensor (gas combustion temperature detecting means) 26 for detecting a temperature $T_2$ of the combustible gas as it is burned is mounted in the combusting section 25.

A gas pipe 28 serving as a gas passage extending from a joint 27 mounted in an upper portion of the surrounding wall of the gasification furnace 1 is connected to a rear end of the burner section 24. The combustible gas produced when the waste material A is thermally decomposed by dry distillation in the gasification furnace 1 is introduced through the gas pipe 28 into the burner section 24 of the combustion chamber 2.

The burner section 24 has an empty chamber 29 defined in an outer surface thereof and isolated from the interior space of the burner section 24. The empty chamber 29 is held in communication with the interior space of the burner section 24 through a plurality of nozzle holes 30 defined in an inner circumferential wall of the burner section 24.

An igniter (second igniting means) 31 for igniting the combustible gas introduced into the burner section 24 is mounted on the rear end of the burner section 24. The igniter 31 is connected through a supply pipe 32 to a fuel supply 35 of combustion assistant oil or the like that is disposed outside of the gasification furnace 1. The igniter 31 burns the fuel supplied from the fuel supply 35 through the supply pipe 32 to generate combustion flames directed from the burner section 24 into the combusting section 25 for igniting the combustible gas that has been introduced from the burner section 24 into the combusting section 25.

The igniter 31 has a controller 31a for controlling the igniting operation of the igniter 31. The controller 31a is supplied with a detected temperature signal from the temperature sensor 26. The controller 31a controls the igniter 31 to ignite the combustible gas depending on the temperature of the combustible gas which is detected by the temperature sensor 26. A boiler 33, for example, is connected to the combustion furnace 2, and uses, as a heat source, the heat of combustion of the combustible gas which is burned by the combusting section 25.

The igniter 3 on the gasification furnace 1 serves to ignite a portion of the waste material A placed in the gasification furnace 1. The igniter 3, which comprises an igniting nozzle 34, is mounted on the slanted side wall section 9 such that the igniting nozzle 34 is oriented horizontally to direct its tip end into the gasification furnace 1. The tip end of the igniting nozzle 34 is positioned near the temperature sensor 13 that is mounted on the bottom wall section 8 of the gasification furnace 1.

The igniter 3 is connected through a supply pipe 36 to the fuel supply 35. The igniter 3 burns the fuel supplied from the fuel supply 35 through the supply pipe 32 to generate combustion flames directed from the tip end of the igniting nozzle 34 into the gasification furnace 1 for igniting the waste material A in the gasification furnace 1.

The tip end of the igniting nozzle 34 is covered with a flame-permeable protector 34a in the form of a mesh screen capable of passing combustion flames from the igniting nozzle 34. The flame-permeable protector 34a, which is positioned between the waste material A in the gasification furnace 1 and the tip end of the igniting nozzle 34, protects the igniting nozzle 34 from contact with the waste material A in the gasification furnace 1, and creates a space between the waste material A and the igniting nozzle 34 for well supplying combustion flames from the igniting nozzle 34 to the waste material A through the space.

The igniter 3 is connected to an igniter controller 37 for controlling igniting operation of the igniter 3. The igniter controller 37 is supplied with detected signals from the temperature sensors 13, 14, 26. The igniter controller 37 comprises an actuator 37a for causing the igniter 3 to ignite the waste material A, and a control unit 37b such as a CPU for controlling operation of the actuator 37a. The control unit 37b operates the actuator 37a depending on the detected signals from the temperature sensors 13, 14, 26. The control unit 37b has a built-in timer (not shown) which is energized after the supply of first combustion flames from the igniter 3 to the waste material A is stopped. The timer is operated for a given period of time to continuously detect the hearth temperature of the waste material A with the temperature sensors 13, 14, for reliably detecting an ignition failure in the event that the combustion temperature is temporarily sharply increased depending on the type of the waste material A and the manner in which the waste material A is placed in the gasification furnace 1, regardless of the fact that the waste material A is not well combusted.

The oxygen supply device 4 for supplying oxygen to the gasification furnace 1 comprises an oxygen supply fan 38 disposed outside of the gasification furnace 1, a main oxygen supply pipe 39 extending from the oxygen supply fan 38, a pair of auxiliary oxygen supply pipes 40, 41 branched from the main oxygen supply pipe 39 and connected respectively to the empty chambers 10, 11 of the gasification chamber 1, a pair of flow control valves 42, 43 disposed respectively in the auxiliary oxygen supply pipes 40, 41, and a pair of valve controllers 44, 45 for controlling the flow control valves 42, 43, respectively. The valve controller 44 is supplied with the detected signal from the temperature sensor 26. The valve controller 45 is supplied with the detected signals from the temperature sensors 26, 23.

The valve controller 44 comprises an actuator 44a such as a motor for opening and closing the flow control valve 42, and a control unit 44b comprising a CPU, etc. for controlling operation of the actuator 44a. The control unit 44b monitors the detected signal from the temperature sensor 26, and operates the actuator 44a depending on the detected signal from the temperature sensor 26. Similarly, the valve controller 45 comprises an actuator 45a such as a motor for opening and closing the flow control valve 43, and a control unit 45b comprising a CPU, etc. for controlling operation of the actuator 45a. The control unit 45b monitors the detected signals from the temperature sensors 23, 26, and operates the actuator 45a depending on the detected signals from the temperature sensors 23, 26.

While a dry distillation of the waste material A is in progress, the valve controller 44 opens the flow control valve 42 to supply oxygen (air) from the oxygen supply fan 38 through the oxygen supply pipes 39, 40 into the empty chamber 10, from which the oxygen is introduced through the air supply ports 12 into the gasification furnace 1. At this time, the valve controller 44 adjusts the opening of the flow control valve 42 depending on the temperature, detected by the temperature sensor 26, at which the combustible gas is combusted in the combustion furnace 2.

When the flow control valve 42 is opened at the end of the dry distillation of the waste material A, the valve controller 45 opens the flow control valve 43 to supply oxygen (air) from the oxygen supply fan 38 through the oxygen supply pipes 39, 41 into the empty chamber 11, from which the oxygen is introduced through the air supply ports 12 into the gasification furnace 1. The valve controller 45 opens the flow control valve 43 at a time determined based on the temperature, detected by the temperature sensor 23, in the gasification furnace 1 and the temperature, detected by the temperature sensor 26, at which the combustible gas is combusted in the combustion furnace 2.

The oxygen supply device 5 for supplying oxygen (air) to the combustion furnace 2 comprises the oxygen supply fan 38, the main oxygen supply pipe 39, a pair of auxiliary oxygen supply pipes 46, 47 branched from the main oxygen supply pipe 39 and connected to the empty chamber 29 of the combustion chamber 2, a pair of flow control valves 48, 49 disposed respectively in the auxiliary oxygen supply pipes 46, 47, and a valve controller 50 for controlling the flow control valve 48. The valve controller 50 is supplied with the detected signal from the temperature sensor 26.

The valve controller 50 comprises an actuator 50a such as a motor for opening and closing the flow control valve 48, and a control unit 50b comprising a CPU, etc. for controlling operation of the actuator 50a. The control unit 50b monitors the detected signal from the temperature sensor 26, and operates the actuator 50a depending on the detected signal from the temperature sensor 26.

The valve controller 50 opens the flow control valve 48 to supply oxygen (air) from the oxygen supply fan 38 through the oxygen supply pipes 39, 46 into the empty chamber 29, from which the oxygen is introduced through the air supply ports 30 into the combustion furnace 2. At this time, the valve controller 50 opens the flow control valve 48 depending on the temperature, detected by the temperature sensor 26, at which the combustible gas is combusted in the combustion furnace 2.

The flow control valve 49 is manually openable and closable by the operator for adjusting the amount of oxygen supplied from the oxygen supply fan 38 to the burner section 24 of the combustion furnace 2.

Operation of the incinerating apparatus of the above structure for carrying out a process ranging from igniting to ashing a waste material will be described below.

To incinerate a waste material A such as waste tires, the door 6 is opened, and the waste material A is charged into the gasification furnace 1 through the charge inlet 7.

After the door 5 is closed, the igniter 3 is actuated to supply combustion flames from the igniting nozzle 4 to the waste material A in the gasification furnace 1, igniting a portion of the waste material A, which now starts to be burned.

When the waste material A starts to be burned partially, the combustion of a lower portion of the waste material A spreads gradually from a region where the temperature sensor 13 is positioned toward a region where the temperature sensor 14 is positioned while consuming any amount of oxygen that has been present in the gasification furnace 1 and a small amount of oxygen that is supplied from the oxygen supply fan 38. Due to the heat of combustion, an upper portion of the waste material A starts being subjected to a dry distillation or being thermally decomposed. As the dry distillation goes on, the waste material A begins to produce a combustible gas, which is introduced from the gasification furnace 1 through the gas pipe 28 into the burner section 24 of the combustion furnace 2.

The combustible gas introduced into the burner section 24 is then mixed with oxygen (air) present in the combustion furnace 2, and ignited by the igniter 31. The combustible gas now starts to be combusted in the combusting section 25 of the combustion furnace 2.

At this time, the combustion of the lower portion of the waste material A in the gasification furnace 1 spreads gradually from the region in which the temperature sensor 13 is located radially outwardly to the region in which the temperature sensor 14 is located, and is gradually stabilized while consuming the small amount of oxygen being supplied from the oxygen supply fan 38. As the combustion of the lower portion of the waste material A is stabilized, the dry distillation of the waste material A due to the heat of combustion proceeds, increasing the amount of combustible gas generated by the dry distillation of the waste material A. Therefore, the amount of combustible gas introduced into the combustion furnace 2 is also increased, and the temperature $T_2$ of the combustible gas as it is burned in the combustion furnace 2 is also increased as shown in FIG. 2.

At this time, the temperature $T_2$ of the combustible gas as it is burned is detected by the temperature sensor 26. When the detected temperature $T_2$ of the combustible gas reaches a predetermined temperature $T_{2a}$ in FIG. 2, the combustible gas is judged as having reached a temperature at which it is capable of spontaneous combustion. The controller 31a shuts down the igniter 31 of the combustion furnace 2. The temperature $T_2$ drops temporarily, and then sharply rises owing to the spontaneous combustion of the combustible gas. When the combustible gas begins its spontaneous combustion, the valve controller 44 starts automatically adjusting the opening of the flow control valve 42 to keep the temperature $T_2$ of the combustible gas at a preset level $T_{2b}$ (see FIG. 2) at which the amount of nitrogen oxides generated by the combustion of the combustible gas is small.

Figure 2:
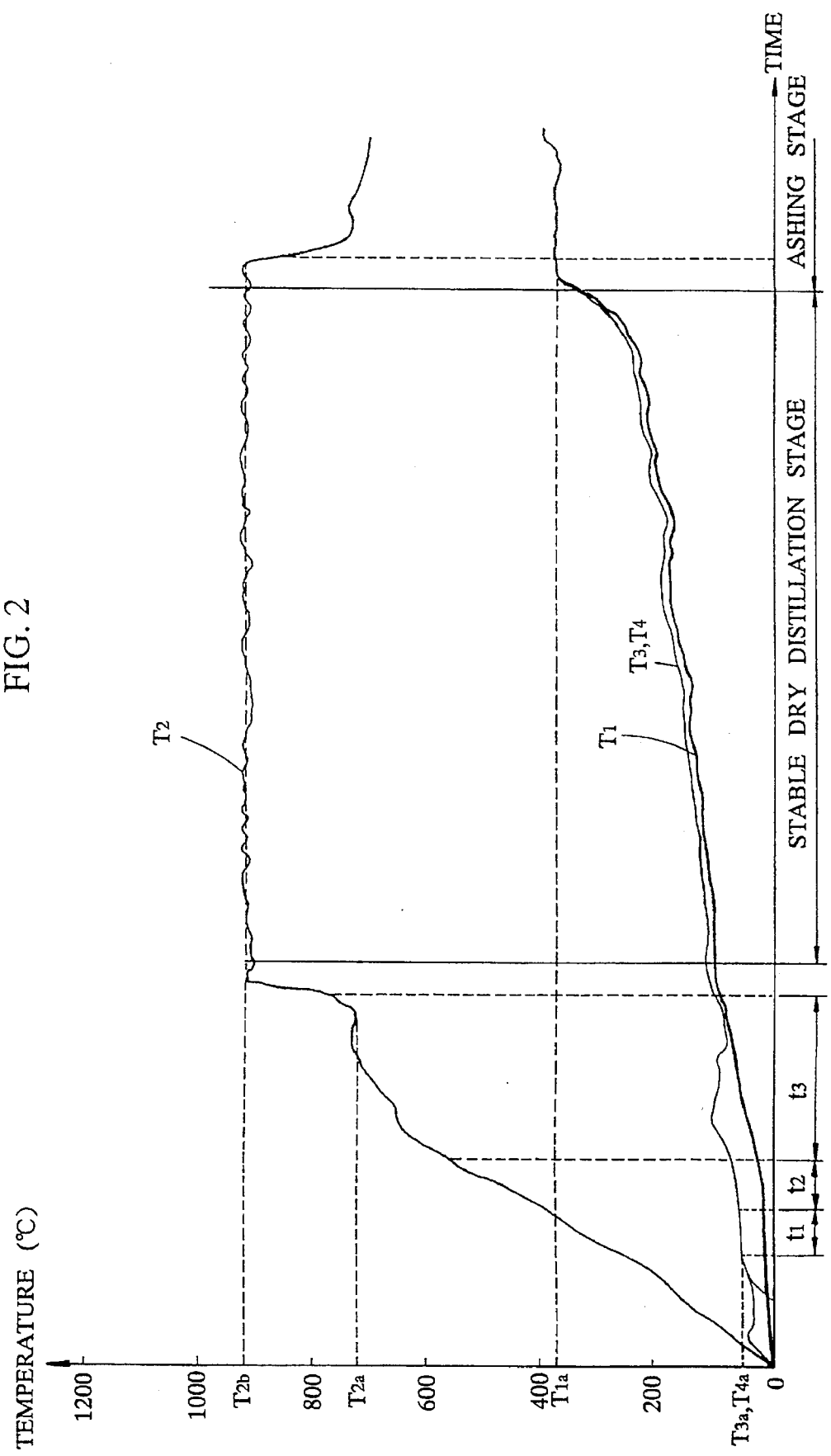
FIG. 2 is a graph illustrative of an operation sequence of the apparatus according to the present invention.
Figure 3:
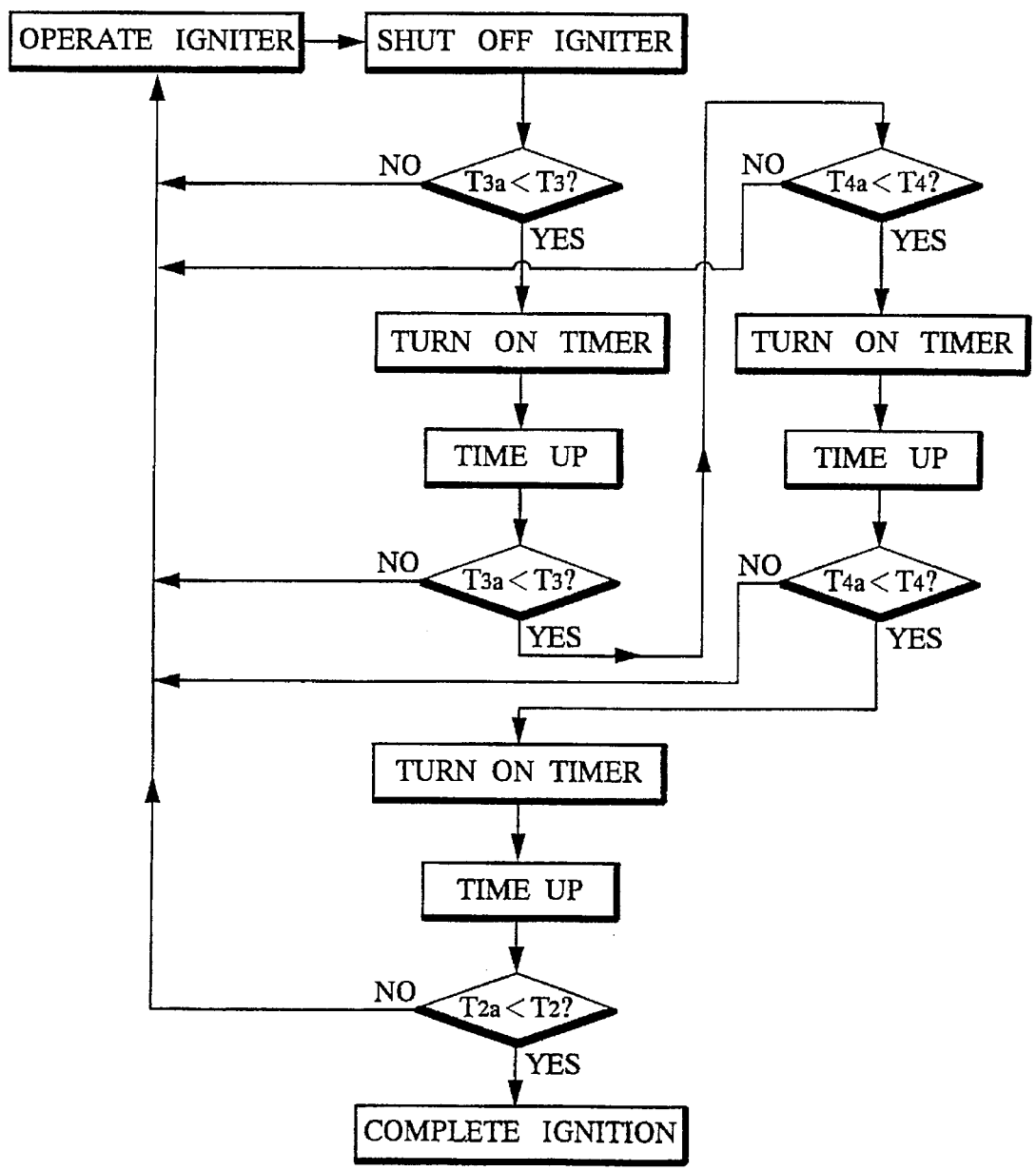
FIG. 3 is a flowchart of the operation sequence of the apparatus according to the present invention.

As shown in FIG. 2, the temperature $T_2$ of the combustible gas is substantially maintained at the preset level $T_{2b}$, during which time the combustion and dry distillation of the waste material A progress stably.

In the dry distillation of the waste material A in the gasification furnace 1, the temperature $T_1$ in the gasification furnace 1 which is detected by the temperature sensor 23 usually varies as shown in FIG. 2.

Specifically, in an initial stage of the dry distillation of the waste material A, the temperature $T_1$ rises as the lower portion of the waste material A starts being burned. When the dry distillation of the waste material A progresses stably, the temperature $T_1$ increases again as the combustion of the lower portion of the waste material A progresses.

The combustion of the combustible gas in the combustion furnace 2 requires oxygen to be consumed. The required oxygen is supplied from the oxygen supply device 5 depending on the temperature $T_2$ of the combustible gas which is detected by the temperature sensor 26.

Specifically, the valve controller 50 of the oxygen supply device 5 opens the flow control valve 48 to a suitable opening depending on the temperature $T_2$ of the combustible gas which is detected by the temperature sensor 26, supplying oxygen from the oxygen supply fan 38 through the oxygen supply pipes 39, 46, the empty chamber 29, and the nozzle holes 30 into the burner section 24 of the combustion furnace 24. In the burner section 24, the combustible gas introduced into the combustion furnace 24 and the supplied oxygen required to effect complete combustion of the combustible gas are mixed with each other.

During the dry distillation of the waste material A, there are developed, in the interior space of the gasification furnace 1, an ashing layer "a", a red-hot layer "b", a fluidized layer "c", a heat transfer layer "d", and a gas layer "e", arranged successively from the bottom to the top of the gasification furnace 1, as shown in FIG. 1. Of these layers "a"~"e", the ashing layer "a" developed upon completion of combustion of the waste material A spreads upwardly as the partial combustion of the waste material A progresses, and the red-hot layer "b" where the waste material A is burned is progressively shifted upwardly. As the ashing layer "a" spreads upwardly and the red-hot layer "b" is progressively shifted upwardly, the fluidized layer "c", the heat transfer layer "d", and the gas layer "e" in which the dry distillation of the waste material A progresses are reduced in extent, i.e., the amount of the waste material A that can be thermally decomposed by dry distillation is reduced.

As the amount of the waste material A that can be thermally decomposed by dry distillation is reduced, regardless of the supply of oxygen from the oxygen supply device 4 to the gasification furnace 1, the waste material A can no longer produce the combustible gas in an amount large enough to keep the temperature $T_2$ at the substantially constant level $T_{2b}$ in the combustion furnace 2. As a result, the amount of combustible gas introduced into the combustion furnace 2 is eventually reduced, and so is the temperature $T_2$ of the combustible gas.

When the temperature $T_2$ of the combustible gas drops, the red-hot layer "b" spreads in the region of the waste material A except the ashing layer "a", and the amount of heat of combustion thereof which is absorbed by the dry distillation of the waste material A is reduced. Therefore, the temperature $T_1$ in the gasification furnace 1 usually sharply increases temporarily as shown in FIG. 2. However, the temperature $T_1$ decreases as the combustion and ashing of the waste material A progress. In a stage where the final ashing of the waste material A progresses, i.e., in an ending stage of the dry distillation of the waste material A, the waste material A is completely combusted and ashed.

In order to keep the above process ranging from the ignition through the stable dry distillation to the ashing of the waste material A well in progress, it is necessary that the waste material A be ignited by the igniter 3 such that combustion will be spread among pieces of the waste material A and stabilized, and a dry distillation of the waste material A will be in stable progress.

According to this embodiment, it is determined whether the ignition of the waste material A is of such a nature as to keep the dry distillation of the waste material A in progress, and if the ignition of the waste material A is not of such a nature, then combustion flames are supplied again from the igniting nozzle 34 to the waste material A for reliably and automatically igniting the waste material A well and automatizing the entire process ranging from igniting to ashing of the waste material A. Curves $T_3$, $T_4$ in FIG. 2 represent hearth temperatures of the waste material A detected respectively by the temperature sensors 13, 14 when the process ranging from igniting to ashing of the waste material A is in good progress. It can be seen from FIG. 2 that the hearth temperatures $T_3$, $T_4$ vary substantially in the same manner as each other with time. FIG. 3 is a flow chart of the operation sequence of the apparatus according to the present invention.

The operation of the apparatus according to the present invention will be described in greater detail with reference to FIGS. 1 through 3. After the supply of combustion flames from the igniting nozzle 34 to the waste material A is stopped, the hearth temperature $T_3$ of the waste material A is detected by the temperature sensor 13 positioned closely to the igniting nozzle 34. If the hearth temperature $T_3$ has not yet reached a predetermined level $T_{3a}$ that is high enough to keep the dry distillation of the waste material A in progress, then it is determined that the waste material A suffers an ignition failure, the control unit 37b operates the actuator 37a to enable the igniting nozzle 34 to supply combustion flames again to the waste material A. If the hearth temperature $T_3$ has reached or increased beyond the predetermined level $T_{3a}$, then it is determined that the waste material A in the vicinity of the igniting nozzle 34 is ignited well, and the control unit 37b does not operate the actuator 37a.

If it has been determined that the hearth temperature $T_3$ has reached or increased beyond the predetermined level $T_{3a}$ after elapse of a preset time period $t_1$, then the hearth temperature $T_4$ of the waste material A is detected by the temperature sensor 14 spaced a distance from the temperature sensor 13. If the hearth temperature $T_4$ has not yet reached a predetermined level $T_{4a}$ that is high enough to keep the dry distillation of the waste material A in progress, then it is determined that the waste material A suffers an ignition failure with no fire transferred from the igniting nozzle 34 to a surrounding region of the waste material A, the control unit 37b operates the actuator 37a to enable the igniting nozzle 34 to supply combustion flames again to the waste material A.

If the hearth temperature $T_4$ has reached or increased beyond the predetermined level $T_{4a}$, then the timer of the control unit 37 is operated for a given time period $t_2$. If the hearth temperature $T_4$ has dropped below the level $T_{4a}$ after elapse of the time period $t_2$, then even when the hearth temperature $T_3$ detected by the temperature sensor 13 has reached or increased beyond the predetermined level $T_{3a}$, it is determined that the combustion has not spread from a region near the igniting nozzle 34 to a surrounding region of the waste material A, and the control unit 37b operates the actuator 37a to enable the igniting nozzle 34 to supply combustion flames again to the waste material A. If the hearth temperature $T_4$ has remained equal to or higher than the predetermined level $T_{4a}$, then it is determined that the combustion has spread well in the waste material A from the region where the temperature sensor 13 is located to the region where the temperature sensor 14 is located, and the control unit 37b does not operate the actuator 37a.

If the hearth temperature $T_4$ has reached or increased beyond the level $T_{4a}$ after elapse of the time period $t_2$, and it is determined that the combustion has spread well in the waste material A, then the timer of the control unit 37 is operated for a given time period $t_3$. If the temperature $T_2$, detected by the temperature sensor 26, of the combustible gas as it is burned in the combustion furnace 2 has dropped below the level $T_{2a}$ for spontaneous combustion after elapse of the time period $t_3$, then even when the hearth temperatures $T_3$, $T_4$ detected by the respective temperature sensors 13, 14 have reached or increased beyond the respective predetermined levels $T_{3a}$, $T_{4a}$, it is determined that the waste material A has suffered a flame failure after the fire has been transferred from the igniting nozzle 34 to the waste material A, and the control unit 37b operates the actuator 37a to enable the igniting nozzle 34 to supply combustion flames again to the waste material A. If the temperature $T_2$ has reached the level $T_{2a}$ after elapse of the time period $t_3$, then it is determined that the waste material A has been ignited for a reliable dry distillation thereof, and the control unit 37b does not operate the actuator 37a.

In the illustrated embodiment, after the hearth temperatures $T_3$, $T_4$ of the waste material A have been detected by the respective temperature sensors 13, 14 as having reached or increased beyond the respective predetermined levels $T_{3a}$, $T_{4a}$, the timer is operated for the respective time periods $t_2$, $t_3$, and thereafter it is confirmed that the hearth temperatures $T_3$, $T_4$ have reached or increased beyond the respective predetermined levels $T_{3a}$, $T_{4a}$. However, the timer may not be employed, and such a confirmation may not be conducted.

In this embodiment, the temperature sensor 13 is disposed closely to the igniter 3 and the temperature sensor 14 is horizontally spaced a distance from the temperature sensor 13 remotely from the igniter 3. However, only one temperature sensor may be employed, and may be located in a position other than the temperature sensors 13, 14.

Both of the temperature sensors 13, 14 may be dispensed with, and it may be determined whether the temperature $T_2$, detected by the temperature sensor 26, of the combustible gas as it is burned in the combustion furnace 2 has reached the level $T_{2a}$ for spontaneous combustion within the time period $t_3$.

In the above embodiment, a final decision as to whether the ignition of the waste material A is of such a nature as to keep the dry distillation of the waste material A in progress is made when the temperature $T_2$, detected by the temperature sensor 26, of the combustible gas as it is burned in the combustion furnace 2 has reached the level $T_{2a}$ for spontaneous combustion within the time period $t_3$. However, such a decision may be carried out if the temperature $T_2$ is continuously detected as having reached or increased beyond the level $T_{2a}$ for spontaneous combustion before the time period $t_3$, e.g., within the time period $t_2$.

Although a certain preferred embodiment of the present invention has been shown and described in detail, it should be understood that various changes and modifications may be made therein without departing from the scope of the appended claims.

What is claimed is:

1. An apparatus for incinerating a waste material by processing the waste material through dry distillation and gasification, comprising:

a gasification furnace for storing a waste material therein and burning a portion of the waste material and thermally decomposing the remainder of the waste material by way of dry distillation with the heat of combustion of the portion of the waste material, thereby producing a combustible gas;

first igniting means disposed in a lower portion of said gasification furnace and having an igniting nozzle for supplying combustion flames to the waste material for a given time period to ignite and combust the portion of the waste material;

a combustion furnace connected to said gasification furnace through a gas introduction passage for combusting the combustible gas introduced therein from said gasification furnace through the gas introduction passage;

second igniting means for supplying combustion flames to the combustible gas in said combustion furnace to ignite the combustible gas until the temperature of the combustible gas in said combustion furnace reaches a temperature at which the combustible gas is capable of spontaneous combustion;

gas combustion temperature detecting means for detecting the temperature of the combustible gas as it is burned in said combustion furnace;

oxygen supply means for supplying said gasification furnace with an amount of oxygen required to combust the portion of the waste material and thermally decompose the remainder of the waste material by way of dry distillation while adjusting the amount of oxygen supplied to said gasification furnace to keep substantially constant the temperature of the combustible gas detected by said gas combustion temperature detecting means after the combustible gas starts spontaneous combustion in said combustion furnace; and ignition control means for determining that the waste material has been ignited when the temperature of the combustible gas detected by said gas combustion temperature detecting means has reached the temperature at which the combustible gas is capable of spontaneous combustion within a predetermined time period after said igniting nozzle stops supplying the combustion flames to the waste material, and controlling said first igniting means to supply combustion flames again from said igniting nozzle to the waste material if the waste material is not determined as having been ignited.

2. An apparatus according to claim 1, wherein said ignition control means comprises:

hearth temperature detecting means mounted in a bottom wall of said gasification furnace for detecting a hearth temperature of the waste material; and means for controlling said first igniting means to supply combustion flames again from said igniting nozzle to the waste material when the hearth temperature of the waste material which is detected by said hearth temperature detecting means has not reached a predetermined temperature after said igniting nozzle stops supplying the combustion flames to the waste material until the temperature of the combustible gas detected by said gas combustion temperature detecting means reaches the temperature at which the combustible gas is capable of spontaneous combustion.

3. An apparatus according to claim 2, wherein said ignition control means comprises:

means for controlling said first igniting means to supply combustion flames again from said igniting nozzle to the waste material when the hearth temperature of the waste material which is detected by said hearth temperature detecting means has not reached said predetermined temperature a predetermined time period after said hearth temperature of the waste material reached said predetermined temperature, after said igniting nozzle stops supplying the combustion flames to the waste material until the temperature of the combustible gas detected by said gas combustion temperature detecting means reaches the temperature at which the combustible gas is capable of spontaneous combustion.

4. An apparatus according to claim 2, wherein said hearth temperature detecting means comprises:

first hearth temperature detecting means disposed closely to said igniting nozzle for detecting a hearth temperature of the waste material; and second hearth temperature detecting means spaced horizontally a given distance from said first hearth temperature detecting means and disposed remotely from said igniting nozzle for detecting a hearth temperature of the waste material;

said ignition control means comprising means for controlling said first igniting means to supply combustion flames again from said igniting nozzle to the waste material when the hearth temperatures of the waste material which are detected by said first and second hearth temperature detecting means have not reached respective predetermined temperatures after said igniting nozzle stops supplying the combustion flames to the waste material until the temperature of the combustible gas detected by said gas combustion temperature detecting means reaches the temperature at which the combustible gas is capable of spontaneous combustion.

5. An apparatus according to claim 4, wherein said ignition control means comprises:

means for controlling said first igniting means to supply combustion flames again from said igniting nozzle to the waste material when the hearth temperature of the waste material which is detected by said first hearth temperature detecting means has not reached a predetermined temperature after said igniting nozzle stops supplying the combustion flames to the waste material until the temperature of the combustible gas detected by said gas combustion temperature detecting means reaches the temperature at which the combustible gas is capable of spontaneous combustion, and controlling said first igniting means to supply combustion flames again from said igniting nozzle to the waste material when the hearth temperature of the waste material which is detected by said second hearth temperature detecting means has not reached a predetermined temperature after the hearth temperature of the waste material which is detected by said first hearth temperature detecting means has reached said predetermined temperature.

6. An apparatus according to claim 5, wherein said ignition control means comprises:

means for controlling said first igniting means to supply combustion flames again from said igniting nozzle to the waste material when the hearth temperature of the waste material which is detected by said first hearth temperature detecting means has not reached said predetermined temperature a predetermined time period after said hearth temperature of the waste material detected by said first hearth temperature detecting means reached said predetermined temperature, and controlling said first igniting means to supply combustion flames again from said igniting nozzle to the waste material when the hearth temperature of the waste material which is detected by said second hearth temperature detecting means has not reached said predetermined temperature a predetermined time period after said hearth temperatures of the waste material detected by said first and second hearth temperature detecting means reached said predetermined temperatures, respectively.

7. An apparatus according to claim 1, further comprising a flame-permeable protector disposed between the waste material stored in said gasification furnace and a tip end of said igniting nozzle for allowing the combustion flames supplied from said igniting nozzle to pass therethrough and preventing the waste material from contacting the tip end of said igniting nozzle.

8. An apparatus according to claim 7, wherein said flame-permeable protector comprises a mesh screen.

* * * * *